J. H. KNIGHT.
TIRE FOR MOTOR AND OTHER ROAD VEHICLES.
APPLICATION FILED AUG. 25, 1913.
1,175,276.
Patented Mar. 14, 1916.
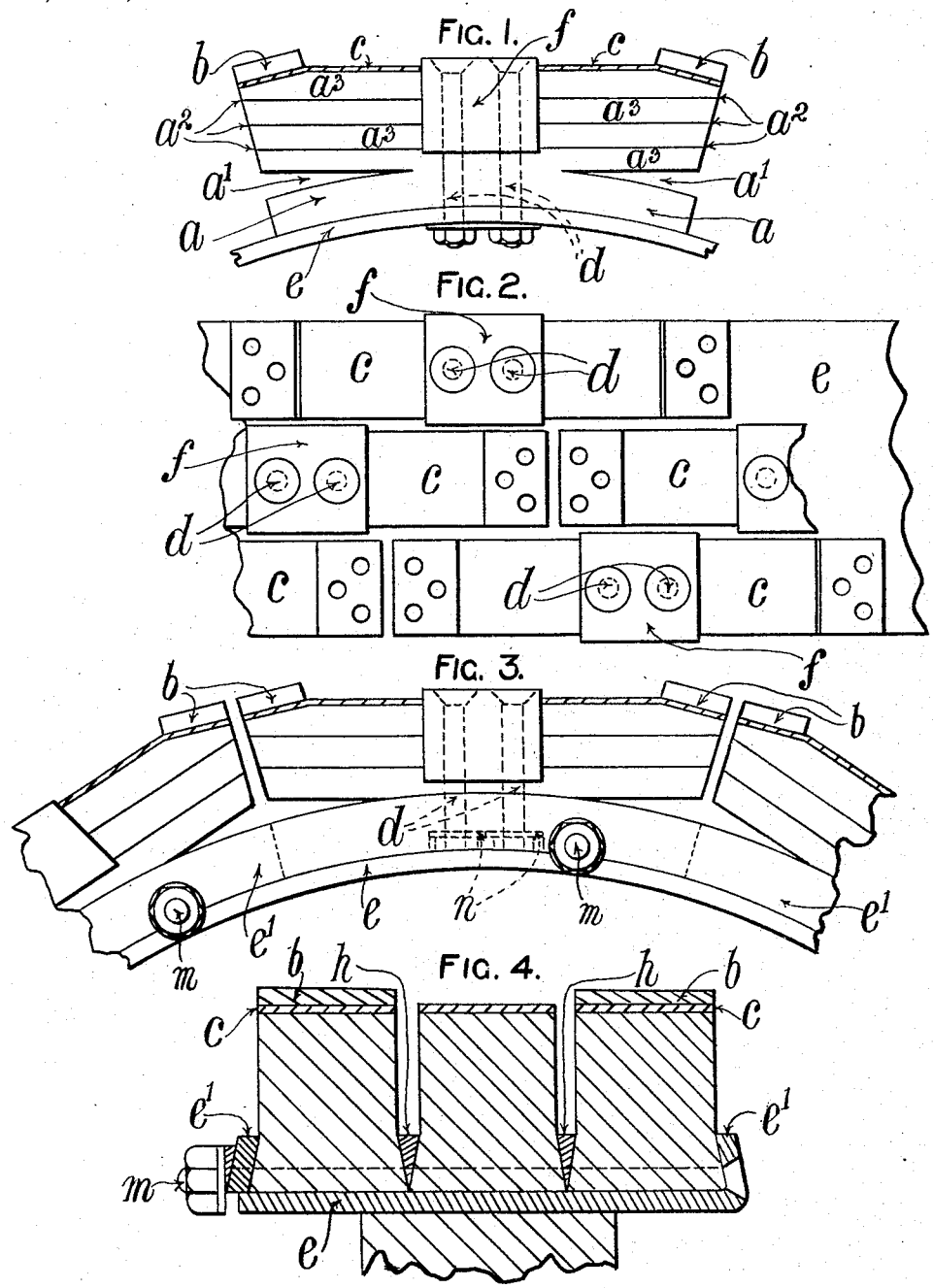
INVENTOR.
J. H. Knight.
per Percy A. Moore
Attorney

UNITED STATES PATENT OFFICE.

JOHN HENRY KNIGHT, OF BARFIELD, FARNHAM, ENGLAND.

TIRE FOR MOTOR AND OTHER ROAD-VEHICLES.

1,175,276.  Specification of Letters Patent.  Patented Mar. 14, 1916.

Application filed August 25, 1913. Serial No. 786,618.

*To all whom it may concern:*

Be it known that I, JOHN HENRY KNIGHT, a subject of the King of Great Britain, residing at Barfield, Farnham, Surrey, England, have invented certain new and useful Improvements in Tires for Motor and other Road-Vehicles, of which the following is a specification.

This invention relates to tires for the wheels of motor and other road vehicles which are composed of blocks of wood, and it consists of an improved construction whereby the wearing properties of such tires are materially increased, and the mounting and dismounting of the blocks is facilitated. I attain these ends by the construction shown in the accompanying drawing in which:—

Figures 1 and 2, are broken views in elevation and plan respectively showing the improved construction of the blocks, and Figs. 3 and 4, are broken views in side elevation and transverse sections respectively showing the improved method of mounting the blocks on the rim or felly of the wheel.

Throughout the views similar parts are marked with like letters of reference.

The blocks of wood $a$ are of a rectangular or approximately rectangular shape and are shaped on their undersides to fit the contour of the rim or felly $e$ of the wheel. In the ends of the blocks—which are so cut that the grain of the wood runs length-wise of the block—are cut V-shaped recesses $a^1$, and above said recesses are a series of saw cuts $a^2$ which together form a series of tongues $a^3$ at the ends of the blocks.

In some cases the upper part of the block may be built up of a series of flat pieces of wood which are held together at or about their centers, which attains the same ends as the saw cuts.

To render the blocks more durable and to preserve their resiliency, they may be soaked or otherwise treated with oil or other suitable material.

To protect the blocks from undue wear, their ends are shod with metallic blocks or studs $b$ which are carried by thin metal plates $c$ of any suitable flexible metal. These plates $c$ are fixed to the blocks $a$ by bolts $d$ which may also be employed as shown in Figs. 1 and 2 to fix the blocks to the wheel rim $e$. A stirrup piece $f$ of suitable metal is laid over the plate $c$ and the top of the block $a$ to form a cap washer for the bolts, and said cap washer also operates to prevent the block from splitting. The blocks or studs $b$ are arranged to lie at an angle with the face of the wooden blocks $a$ so that they impart a beveled formation to the front and back edges of same, the result of which is that said blocks or studs present tangential surfaces when the wooden blocks are mounted on the wheel rim.

For wheels for heavy vehicles the wooden blocks $a$ are arranged in two or more rows placed side by side, in which case they are preferably stepped as shown in Fig. 2, and when the blocks are arranged in such a manner they are preferably fixed to the wheel rim $e$ in the manner shown in Figs. 3 and 4 which consists in making the bases of the blocks of a dovetail shape and clamping the rows of blocks and intermediate spacing rings $h$ of a wedge shape in cross section together and to a wheel rim $e$ having incurved side flanges $e^1$ by means of a series of transverse bolts $m$ one flange $e^1$ of the rim being detachable for the purpose of getting the intermediate spacing rings $h$ and the blocks $a$ into position. In this construction the bolts $d$ do not pass through the wheel rim but only through the blocks $a$, the plates $c$, and the stirrup piece $f$, but plates or washers $n$ may be employed on the undersides of the wooden blocks for the heads or nuts of the bolts $d$ to bear against.

What I claim as my invention, and desire to secure by Letters Patent is:—

1. A tire for motor or other road vehicles, comprising a series of blocks of wood in the ends of which are cut recesses following the grain of the wood, flexible metal plates secured to the outer faces of said blocks, and metallic blocks or studs carried by said plates.

2. A tire for motor or other road vehicles, comprising a series of blocks of wood in the ends of which are cut recesses and slits which follow the grain of the wood, flexible metal plates secured to the outer faces of said blocks, and metallic blocks or studs carried on the ends of said plates.

3. In a tire for motor and other road vehicles the combination of a series of wooden blocks in the ends of which are saw cuts and recesses following the grain of the wood forming tongues, said outermost tongue having its fore and aft edges beveled. flexible metal plates mounted on the outer faces of said outermost tongue, metallic blocks or studs carried by said plates adjacent said beveled fore and aft edges and adapted to lie at an angle with the face of the wooden blocks so that they give a beveled formation to the fore and aft edges of said blocks, and means for fixing the wooden blocks to the wheel rim.

In testimony whereof I have signed my name in the presence of two subscribing witnesses.

JOHN HENRY KNIGHT.

Witnesses:
A. MELLWARD FLACK,
ALBERT S. MICKHIN.

Copies of this patent may be obtained for five cents each, by addressing the "Commissioner of Patents, Washington, D. C."